(12) United States Patent
Gercke et al.

(10) Patent No.: US 7,744,103 B2
(45) Date of Patent: Jun. 29, 2010

(54) HOLLOW SHAFT JUNCTION CONNECTION

(75) Inventors: Matthias Gercke, Affinghausen (DE); Jens Eismann, Melle (DE); Franz-Josef Marquardt, Georgsmarienhütte (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 93 days.

(21) Appl. No.: 12/095,008
(22) PCT Filed: Nov. 21, 2006
(86) PCT No.: PCT/DE2006/002056
§ 371 (c)(1),
(2), (4) Date: May 27, 2008
(87) PCT Pub. No.: WO2007/059747
PCT Pub. Date: May 31, 2007

(65) Prior Publication Data
US 2008/0268965 A1  Oct. 30, 2008

(30) Foreign Application Priority Data
Nov. 28, 2005 (DE) .................. 10 2005 056 878

(51) Int. Cl.
*B60G 21/055* (2006.01)
(52) U.S. Cl. ............................................. 280/124.107
(58) Field of Classification Search .......... 280/124.106, 280/124.107, 124.11, 124.111, 124.128, 280/124.13, 124.152, 124.166, 124.153, 280/679, 684
See application file for complete search history.

(56) References Cited

U.S. PATENT DOCUMENTS

| | | | |
|---|---|---|---|
| 3,944,017 A | 3/1976 | Foster | |
| 4,809,562 A | 3/1989 | Bendoraitas et al. | |
| 6,283,463 B1 | 9/2001 | Park | |
| 6,328,322 B1 * | 12/2001 | Pierce | 280/124.131 |
| 6,945,548 B2 * | 9/2005 | Dudding et al. | 280/124.157 |
| 2002/0117816 A1 * | 8/2002 | Dudding et al. | 280/6.151 |

FOREIGN PATENT DOCUMENTS

| | | |
|---|---|---|
| DE | 24 36 270 A1 | 2/1976 |
| DE | 38 33 326 | 4/1989 |
| DE | 43 13 296 A1 | 6/1994 |
| DE | 43 42 809 A1 | 6/1994 |
| DE | 196 48 996 A1 | 6/1998 |
| DE | 101 59 641 A1 | 6/2003 |
| DE | 202 11 065 U1 | 1/2004 |
| EP | 0 190 841 A2 | 8/1986 |
| EP | 1 314 587 A2 | 5/2003 |
| JP | 10 045043 | 2/1998 |

* cited by examiner

*Primary Examiner*—Faye M. Fleming
(74) *Attorney, Agent, or Firm*—McGlew and Tuttle, P.C.

(57) ABSTRACT

A junction connection is provided that is used to connect a torque transmitting junction component (2) to a hollow shaft (1). The junction component (2) includes a continuous recess which has a shape which corresponds to the outer cross-section of the hollow shaft (1) and which is used to receive the hollow shaft (1). The hollow shaft (1) includes a press stopper (8) in the connection area between the hollow shaft (1) and the junction component (2). The press stopper (8) forms, at least sectionally, a press fit with the wall of the hollow shaft (1). The junction connection enables the transmission of comparatively high torque during the entire service life thereof. The junction connection is also compatible with thin-walled, light-weight hollow shafts. The junction connection limits production costs, mounting and maintenance.

20 Claims, 2 Drawing Sheets

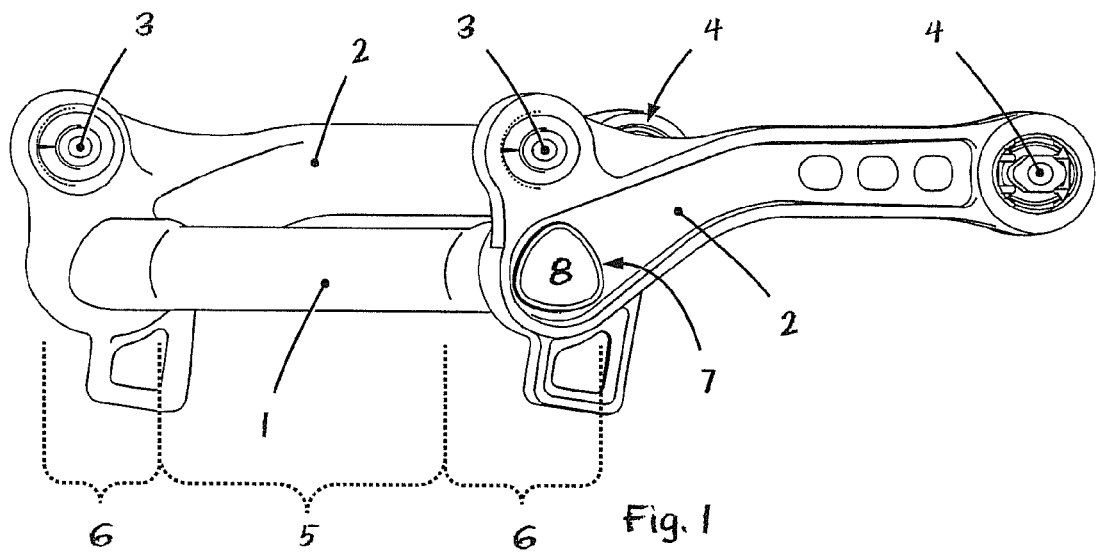
Fig. 1
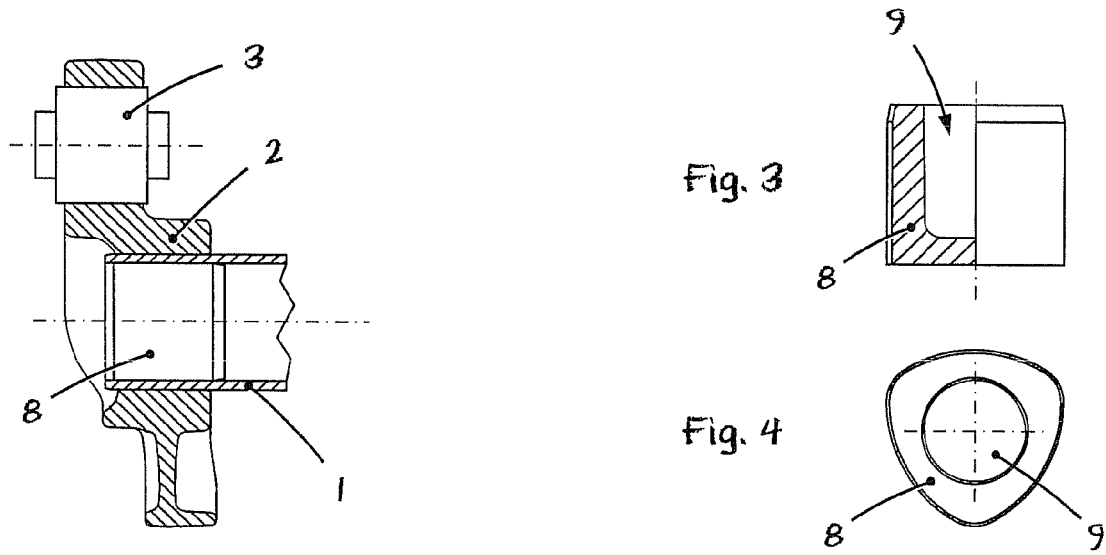
Fig. 2
Fig. 3
Fig. 4
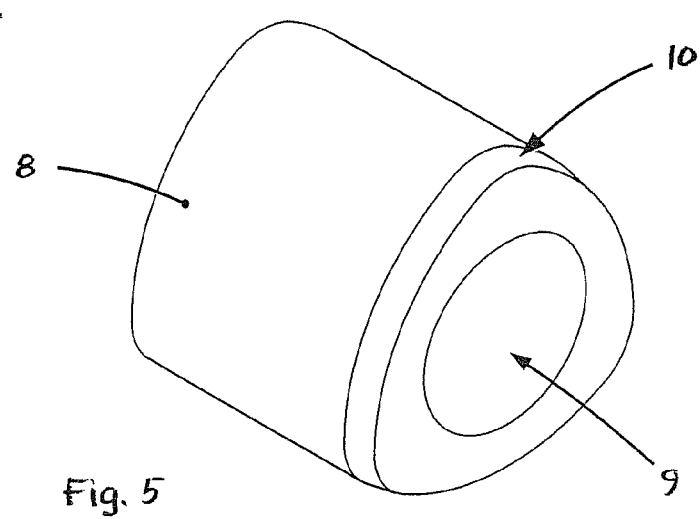
Fig. 5

HOLLOW SHAFT JUNCTION CONNECTION

CROSS REFERENCE TO RELATED APPLICATIONS

This application is a United States National Phase application of International Application PCT/DE2006/002056 and claims the benefit of priority under 35 U.S.C. §119 of German Patent Application DE 10 2005 056 878.5 filed Nov. 28, 2005, the entire contents of which are incorporated herein by reference.

FIELD OF THE INVENTION

The present invention pertains to a junction connection for the torque-transmitting connection of a hollow shaft to a junction component, according to the preamble of patent claim 1.

BACKGROUND OF THE INVENTION

Junction connections of the type mentioned in the introduction are used for connection between all kinds of torque-transmitting components and the shafts belonging to them. As an example, but by no means exclusively, junctions of this class are used to connect torque levers or control arms to shafts or stabilizer means. One of the fields of use here is in the area of the shock- and vibration-absorbing suspension of motor vehicle driver's cabs, especially in trucks and similar heavy-duty trucks, in order to uncouple the driver's cab from the chassis of the vehicle in respect to vibrations and motions.

Since the spring rates of the chassis springs are inevitably high in heavy-duty trucks because of the heavy vehicle loads, unevennesses in the road surface or even vibrations from axles and the drivetrain are still transmitted to a considerable extent to the chassis via the axle spring mounting. In order to minimize the transmission of such continuous shocks and vibrations to the driver's cab and hence to the driver's workplace in terms of ergonomics and occupational safety, driver's cab suspensions have been developed in which the driver's cab is supported on the vehicle chassis with the use of a separate suspension system. Such suspension systems for the driver's cab can be designed with lower spring rates and softer shock absorbers than the axle suspension thanks to the much lower weight of the driver's cab compared to the weight of the vehicle, and unevennesses of the road surface or vibrations originating from the drivetrain or axles of the vehicle can therefore be isolated or kept away markedly better from the driver's workplace thanks to such cab suspension systems.

Such suspension means for driver's cabs are of a complicated design, especially in case of increased requirements on the supporting of lateral forces or kinematics, for example, the suppression of pitch and roll. Thus, besides the spring and absorber elements, roll stabilizers must be provided, similarly to the case of axle suspensions of motor vehicles, with which roll stabilizers the undesired, lateral roll of the driver's cab relative to the chassis of the vehicle can be limited.

Roll stabilizers in the form of torque rods or stabilizer shafts, by which the spring compression paths of the suspension elements of the driver's cab, which elements are the left and right elements relative to the direction of travel, are coupled to a certain extent, are used for roll stabilization—for example, during travel on an oblique road surface or in curves, but also, e.g., in the case of unevennesses on one side of the road surface—in suspension means for driver's cabs according to the state of the art.

Torque levers, whose respective end located away from the shaft is connected to the driver's cab by means of a bearing, while the end of the torque levers that is located close to the shaft has a connection to the roll stabilizer, are arranged here, in general, at the two axial ends of the roll stabilizer to introduce the forces, torques and motions of the driver's cab into the roll stabilizer. The bearing of the torque levers that is rigidly connected to the chassis is represented here either by the roll stabilizer itself, or another mounting point each, which is used for connecting the torque levers to the chassis and for introducing the forces of reaction occurring during rolling motions into the chassis, is arranged at the end of the torque levers that is the end close to the shaft.

However, junction connections of this class especially between roll stabilizers and the torque levers belonging to them are subject to high stresses during their lifetime. This is especially true when, for example, for reasons of weight reduction while increasing the torsional rigidity at the same time, torque rods or stabilizer shafts for roll stabilizers are designed in the form of comparatively thin-walled torsion tubes or hollow shafts.

It is known from the state of the art in connection with the torque-transmitting transmission of such torsion tubes to corresponding junction components, for example, torque levers, that the torque levers with the torsion tubes are especially welded or pressed together with the torsion tubes. However, a connection established in this manner between the torque lever and the torsion tube represents a heavily loaded potential weak point in both cases.

In case of a welded connection between the torque lever and the torsion tube, this is linked above all with the heat introduced during welding and with the microstructural changes associated therewith as well as with notch stresses. Even though pure pressed connections can be established between the torsion tube and the torque lever by comparatively gentle cold forming, they often fail to attain the necessary service life in the case of the strong forces and high torques that occur. This is also true when a cross-sectional shape that differs from the circular shape is selected in the area of the connection to the junction component for the purpose of increasing the torque that can be transmitted.

This is linked, especially in the comparatively thin-walled torsion tubes used for weight reasons, with the fact that the tube wall can transmit only limited pressing and shearing forces into the torsion tube in the area in which the force is introduced. For example, force fits between the hollow shaft and the junction component cannot be designed with the rigid press fit required for transmitting high torques for this reason. When the comparatively weak specific forces that can be transmitted are exceeded, the tube wall will therefore separate in the area of the press fit of the torque lever, or the tube wall can be pressed in, which leads to the subsequent failure of the tube cross section.

However, as the applicant found out, the field of application of the junction connection also extends, for example, to roll stabilization and axle guiding especially in utility vehicle axles. Mainly roll stabilizers consisting of solid material and bent from one piece, which have a correspondingly heavy weight, especially in heavy utility vehicles, and whose degree of material utilization is conceivably unfavorable in respect to the intended twisting and torsional rigidity, are used for the roll stabilization of utility vehicle axles in the state of the art. The replacement of the massive roll stabilizers with bulky, comparatively thin-walled and hence lighter-weight hollow shafts has hitherto often been unsuccessful because of the problematic connection technique between such hollow shafts and the torque-transmitting junction components, for example, torque levers.

SUMMARY OF THE INVENTION

Against this background, the object of the present invention is to provide a connection for the torque-transmitting junction between hollow shafts and junction components thereof, with which the drawbacks can be overcome. The junction connection shall make it possible to transmit high torques without damage between especially thin-walled hollow shafts and the respective junction components, while a high degree of certainty against failure is at the same time guaranteed. Furthermore, the connection between the hollow shaft and the junction component shall be able to be inexpensive and carried out in a reliable process in production and mounting.

According to the invention, a junction connection is provided for a torque-transmitting arrangement. The junction connection comprises a junction component and a hollow shaft with a shaft wall. The junction component is connected to the hollow shaft in a connection area of the hollow shaft and the junction component. The junction component comprises a continuous recess corresponding in shape to an outer cross section of the hollow shaft for receiving the hollow shaft. A press plug is provided in the connection area of the hollow shaft and the junction component. The press plug forms a force fit with the shaft wall of the hollow shaft at least in some areas.

The junction connection according to the present invention is used, in a known manner taken in itself, for the torque-transmitting arrangement of a junction component, for example, of a torque lever or a hub, on a hollow shaft. The junction component comprises here, for receiving the hollow shaft, a continuous recess, whose shape corresponds to the outer cross-sectional shape of the hollow shaft.

However, the junction connection is characterized according to the present invention in that the hollow shaft contains a press plug in the area of the connection to the junction component. The press plug forms a force fit with the wall of the hollow shaft on at least parts of its circumferential surface.

Thanks to the press plug according to the present invention, it is also possible to connect comparatively thin-walled hollow shafts with corresponding junction components, for example, hubs or torque levers, without the risk of failure of the press fit and/or tube wall in the area of the junction connection under high load on the junction connection. This is linked with the fact that the press plug supports the tube wall of the hollow shaft in the area of the junction connection and presses it onto the inner surface of the recess of the junction component, so that a surface pressure or force fit is obtained not only between the press plug and the tube wall but also between the outer surface of the hollow shaft and the inner surface of the recess of the junction component.

It is thus possible to attain pressing forces that are higher by several orders of magnitude between the tube wall and the junction component than this is possible in case of pressed connections according to the state of the art.

Thanks to the present invention, not only is it possible to transmit stronger forces and higher torques between other practically unchanged junction components and hollow shafts, but it also becomes possible to further increase the diameter of the hollow shafts used while reducing their wall thickness at the same time, which can be utilized for weight reduction in the sense of the desired lightweight construction on the vehicle.

The particular cross-sectional shape of the outer circumference of the hollow shaft as well as of the recess of the junction component in the connection area with the junction component is at first nonessential for embodying the present invention. The press plug according to the present invention can rather also be advantageously used in hollow shafts having a circular outer cross section in the connection area.

However, according to a preferred embodiment of the present invention, the hollow shaft has, at least in the connection area with the junction component, a cross-sectional shape deviating from the circular shape. The torque that can be transmitted between the hollow shaft and the junction component can thus be further increased in a decisive manner, because, in addition to the frictional connection, there is also a positive-locking connection due to the press fit as well as the press plug as a result because of the connection cross section deviating from the circular shape.

The increase in the torque that can be transmitted is now obtained independently from the concrete cross-sectional shape of the hollow shaft as well as of the junction component, which shape deviates from the circular shape. For example, it is conceivable that the hollow shaft is designed with oval or elliptical cross-sectional shape in the junction area, just as the junction recess, with which especially an only slight additional notch effect is associated. As the applicant has found out, even a markedly more favorable operating stress curve can become established in this manner, depending on the application and the design, than in the case of a circular cross-sectional shape of the junction area.

However, according to another preferred embodiment of the present invention, the hollow shaft as well as the recess of the junction component has an essentially polygonal cross section. An especially intimate positive-locking connection is achieved as a result between the hollow shaft and the junction component, and it is possible to transmit especially high torques.

The polygonal outer cross section of the hollow shaft or the inner cross-sectional shape of the recess of the junction component, which corresponds to this in shape, now preferably has an always finite curvature. In other words, this means that the outer cross-sectional shape of the hollow shaft and the inner cross-sectional shape of the junction component have no sharp edges, but the edges of the polygonal cross-sectional form are rather rounded. The notch effect occurring in the material in the area of the edges of the polygon is thus reduced and the torque that can be transmitted without damage in the long term is increased. According to another preferred embodiment of the present invention, the cross-sectional shape of the hollow shaft and the junction component is designed in the junction area as an orbiform curve. The so-called orbiform curve represents a closed line, which always touches all four sides of the square in each position within a fitting square, as well as a circle inscribed in the square. The orbiform curve as a cross-sectional shape of the hollow shaft and the junction component in the junction area represents an especially effective compromise between the polygon with optimal positive-locking connection but strong notch effect, on the one hand, and the circular cross section, without positive-locking connection as well as without notch effect, on the other hand.

The present invention can at first be embodied independently from the concrete shape and cross-sectional shape of the press plug as long as especially the thin-walled hollow shaft is prevented from collapsing because of the torques introduced by means of pressing of the wall of the hollow shaft outwardly by the press plug. For example, the use of a press plug with essentially circular cross section is conceivable even in the case of an essentially polygonal cross-sectional shape of the hollow shaft and the recess of the junction component, because this [press plug] can also support the wall at least in some areas and press it onto the inner surface of the recess of the junction component.

However, the shape of the outer cross section of the press plug is preferably designed such that it corresponds to the inner cross-sectional shape of the hollow shaft in the connection area with the junction component. The pressing between the press plug and the hollow shaft thus takes place on the entire circumference of the hollow shaft, and an effective and reliable transmission of high torques is achieved.

According to another preferred embodiment of the present invention, the press plug and the recess of the junction component has a slightly conically tapering design in the axial direction of the shaft in the connection area of the hollow shaft and the junction component. Even stronger pressing pressures are obtained in this manner between the press plug, the hollow shaft and the recess of the junction component when the press plug is pressed in. Higher torques can thus be reliably transmitted, and, moreover, the junction component will have a higher tear-off resistance in the axial direction, because the press plug expands the previously prismatic end of the hollow shaft during pressing in and is pressed onto the conically tapering inner contour of the junction component in the process.

Provisions are made according to another preferred embodiment of the present invention for the press plug to be hollow, or to have a recess in the axial direction. This leads to a weight reduction of the press plug, on the one hand, and makes it possible, on the other hand, to improve the course of the strain lines especially in the area of the axial end of the press plug, which is the inner end in the mounted state, because of the now smaller jumps in wall thickness at the site of entry of the hollow shaft into the pressed connection.

The present invention can be embodied regardless of the concrete material selected for the press plug. According to preferred embodiments, the press plug is manufactured, however, from a ferrous material (for example, steel) or a nonferrous material (for example, aluminum). A press plug made of steel can be manufactured at low cost and at the same time offers high strength and makes it possible to produce strong surface pressures. A press plug made of aluminum is especially advantageous concerning its low weight as well as in terms of the high ductility of aluminum. The latter also contributes to a reduction of the harmful edge pressure and of the undesired notch effect associated therewith, which can otherwise develop especially in the area of entry of the hollow shaft into the pressed connection.

According to another preferred embodiment, the press plug has a pointed edge or a circumferential chamfer at least at its axial ends. A press plug of such a design can be introduced and mounted more easily, and, furthermore, tilting as well as any possible chip formation in the area of the inner surface of the hollow shaft is prevented from occurring when the press plug is being pressed into the opening of the hollow shaft.

Provisions are made in another embodiment of the present invention for the cross-sectional shape of the hollow shaft, which deviates from the circular shape, to be present essentially only in the connection area between the hollow shaft and the junction component. In other words, this means that the hollow shaft has a cross-sectional shape different from that in the connection areas, especially a circular cross section, outside the connection areas with the junction components. As a result, costs can be saved in manufacturing the hollow shaft, because the hollow shaft according to this embodiment receives the cross-sectional shape deviating from the circular shape at its two ends only.

The present invention is embodied independently from the concrete intended use of the junction connection, because the junction connection according to the present invention can be used in the great variety of types of shaft-and-hub connections. According to especially preferred embodiments of the present invention, the hollow shaft is, however, a torque rod spring or a roll stabilizer, especially a roll stabilizer for a driver's cab of a truck, or a roll stabilizer of a utility vehicle axle connection. The junction component preferably is a control arm for guiding the driver's cab in case of vertical relative motions between the driver's cab and the chassis or a control arm for guiding a vehicle axle. The latter embodiment leads to the additional advantage that a roll stabilizer of a utility vehicle axle connection can thus additionally also perform demanding control arm or wheel guiding tasks, especially also in case of heavy utility vehicles, as a result of which the need for assembly units that would otherwise be necessary can be eliminated and corresponding installation space and weight as well as costs can be saved.

The present invention will be explained below in more detail on the basis of drawings, which represent exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is an isometric view of a roll stabilizer for a driver's cab with an embodiment of a junction connection according to the present invention;

FIG. 2 is a schematic view of a junction connection of the roll stabilizer according to FIG. 1 in the longitudinal section through the hollow shaft and the elastomer bearing;

FIG. 3 is a half section of the press plug of the junction connection of the roll stabilizer according to FIGS. 1 and 2;

FIG. 4 is the top view of the press plug according to FIG. 3;

FIG. 5 is an isometric view of the press plug according to FIGS. 3 and 4;

DESCRIPTION OF THE PREFERRED EMBODIMENTS

Figure 6:
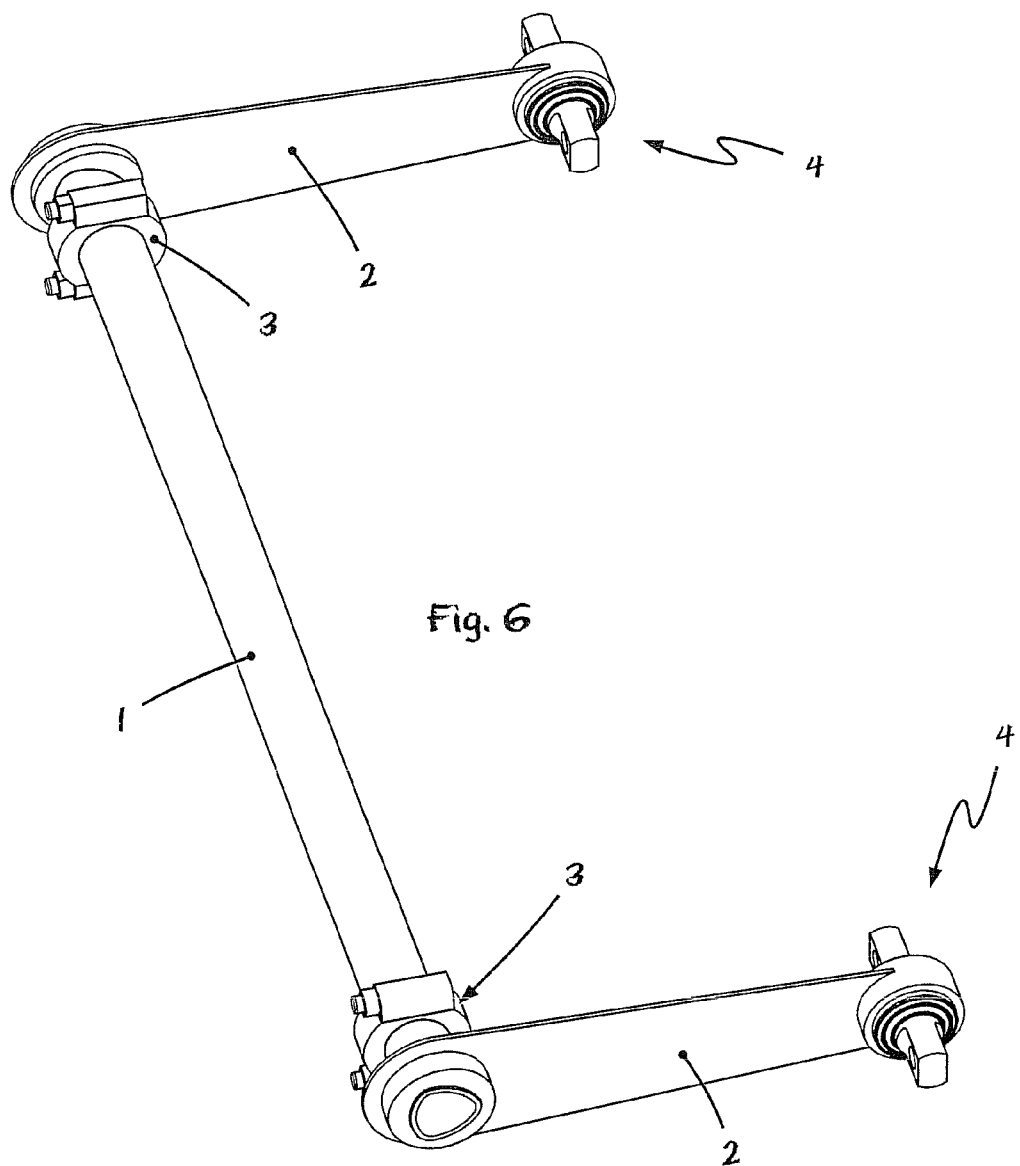
FIG. 6 is an isometric view of a roll stabilizer for an axle connection with another embodiment of a junction connection according to the present invention.

Referring to the drawings in particular, FIG. 1 shows a roll stabilizer for the driver's cab (not shown) of a truck. The hollow shaft 1, which acts as a torsion element and at the two ends of which a torque lever 2 each is arranged, is recognized. Each of the two torque levers 2 carries two mounting points 3 and 4 provided with elastomer bearings, the mounting point 3 located close to the shaft being used to connect the roll stabilizer to the driver's cab and the mounting point 4 located away from the shaft being used for connection to the chassis of the vehicle. However, the function of the pairs of mounting points 3, 4 may also be reversed while maintaining the functionality of the roll stabilizer, which means that the mounting points 3 located close to the shaft are articulated to the driver's cab and the mounting points 4 located away from the shaft are articulated, by contrast, to the chassis.

It can, furthermore, be recognized from FIG. 1 that the hollow shaft 1, which has a circular cross section in its middle area 5, is widened in the areas 6 of its ends to a cross-sectional shape corresponding essentially to an orbiform curve 7, the cross-sectional shape of the orbiform curve 7 being derived from a triangle in this embodiment. The torque levers 2 have a recess, which corresponds to the external diameter 7 of the hollow shaft 1 in the area 6 of the ends thereof of the hollow shaft, and which thus likewise corresponds to the cross section of an orbiform curve 7.

To mount the roll stabilizer, the two torque levers 2 are at first attached to or pressed onto the previously widened ends 6 of the hollow shaft 1. The two end-side openings of the hollow shaft 1 are subsequently closed with a press plug 8 each, whose external circumference likewise corresponds to an orbiform curve 7 corresponding to the cross-sectional shape of the hollow shaft 1 and the recess of the torque lever 2. The dimensions of the external circumference of the press plug 8 are selected here to be such that a force fit becomes established between the recess of the torque lever 2, the wall of the hollow shaft 1, which said wall is arranged therein, and the press plug 8 arranged in the hollow shaft 1.

FIG. 2 shows one of the two connection areas between the hollow shaft 1 and the torque lever 2 in a longitudinal section through the hollow shaft 1 and the elastomer bearing 3 located close to the shaft. The end of the hollow shaft 1 with the press plug 8 arranged therein is recognized. The press plug 8 presses the wall of the hollow shaft 1 against the inner surface of the recess in the torque lever 2. Torques, which exceed the torques that can be transmitted without a press plug 8 by several orders of magnitude, can be reliably transmitted in this manner between the torque lever 2 and the hollow shaft 1.

An additional advantage of the use of the press plug 8 according to the present invention is that the interior of the hollow shaft 1 is completely sealed in this manner against the environment. As a result, corrosion is reliably prevented from occurring inside the hollow shaft 1, and thus it also becomes unnecessary to apply corrosion protection to the inner surface of the hollow shaft 1, as a result of which costs are, in turn, saved. Due to the local reinforcement of the hollow shaft 1 by the plug 8 pressed in, the maximum bending stresses occurring because of the bending moments likewise acting on the hollow shaft 1 are displaced, moreover, into the less heavily stressed middle areas 5 of the hollow shaft 1. The failure-proofness of the junction connection according to the present invention can be further increased hereby as well.

FIGS. 3 and 4 show the press plug 8 of the junction connection according to FIGS. 1 and 2 once again in a half section and a top view, respectively. It is recognized that the press plug 8 has a central recess 9. Due to the press plug 8, made hollow in this manner, the course of the strain lines is improved in the area of the junction connection, on the one hand, the rigidity jumps occurring there are reduced, and, furthermore, weight is reduced as well.

FIG. 5 shows the press plug of the junction connection according to FIGS. 1 and 2 once again in an isometric view. The pointed edge or chamfer 10, which the press plug 8 carries on its front side facing the center of the hollow shaft 1, is recognized, in particular, next to the recess 9. Thanks to the chamfer 10, the press plug 8 can be introduced more easily, and, moreover, damage to or peeling off of material on the inner surface of the hollow shaft 1 is avoided.

Figure 7:
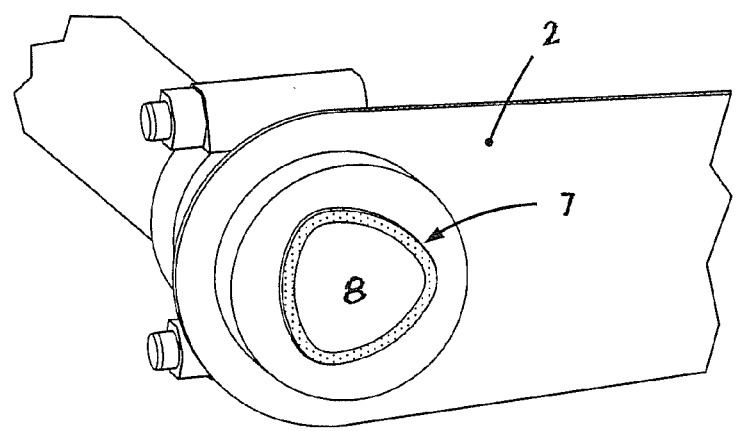
FIG. 7 is in an enlarged partial isometric view corresponding to FIG. 6 showing connection area of the torque lever of the roll stabilizer according to FIG. 6 with the junction connection.

FIG. 6 and FIG. 7 show another roll stabilizer for an axle connection. The torque levers 2 are again connected in this roll stabilizer to corresponding recesses of a corresponding shape in the torque levers 2 designed, e.g., as a welded construction here by means of ends of the otherwise cylindrical hollow shaft 1, which said ends are shaped as an orbiform curve. Other embodiments, for example, deep-drawn or cast torque levers, are also conceivable for the mode of construction of the torque levers. In addition, bearing 3, which is located close to the shaft and is, for example, rigidly connected to the axle, is arranged directly on the hollow shaft 1, while bearing 4, which is located away from the shaft and can be connected, for example, to the chassis, is arranged, as before, at the end of the torque levers 2.

It appears clearly once again especially from the enlarged view in FIG. 7 that the thin wall of the hollow shaft (shown by dotted line here for illustration), which is delicate in itself, is enclosed in a completely positive-locking manner between the material of the recess of the torque lever 2 and the material of the press plug 8. Reliable torque transmission is thus obtained despite the cross-sectional shape of the recess, the end of the hollow shaft and the press plug 8, which has comparatively great radii of curvature as an orbiform curve 7, and this cross-sectional shape thus also contributes to an especially uniform flux of forces.

Thus, it becomes clear as a result that thanks to the present invention, a connection is established for torque-transmitting junction between hollow shafts and junction components, which ensures the transmission of comparatively high torques over the entire service life of the device. The junction connection according to the present invention makes it possible, in particular, to use thin-walled and hence lower-weight hollow shafts. Finally, a reduction of costs in production and mounting as well as a reduction of the need for maintenance in operation can be expected from the junction connection according to the present invention.

Thus, the present invention makes a contribution to the improvement of the technology of shaft-and-hub connections, especially in the field of the intended use in roll stabilizers, for axle connections and in the mounting of the driver's cab of utility vehicles.

While specific embodiments of the invention have been shown and described in detail to illustrate the application of the principles of the invention, it will be understood that the invention may be embodied otherwise without departing from such principles.

The invention claimed is:

1. A junction connection for a torque-transmitting arrangement, the junction connection comprising:
    a junction component;
    a hollow shaft with a shaft wall, said junction component being connected to said hollow shaft in a connection area of said hollow shaft and said junction component, said junction component comprising a continuous recess corresponding in shape to an outer cross section of said hollow shaft for receiving said hollow shaft; and
    a press plug in the connection area of said hollow shaft and said junction component, wherein said press plug forms a force fit connection with said shaft wall of said hollow shaft at least in some areas, said hollow shaft being connected to said junction component via said force fit connection.

2. A junction connection in accordance with claim 1, wherein said hollow shaft and said recess of said junction component have a cross-sectional shape deviating from a circular shape.

3. A junction connection in accordance with claim 1, wherein said hollow shaft and said recess of said junction component have an, essentially polygonal cross section.

4. A junction connection in accordance with claim 3, wherein the circumference of said polygonal cross-sectional shape has an always finite curvature.

5. A junction connection in accordance with claim 1, wherein a cross-sectional shape of said hollow shaft and said junction component are designed as a orbiform curve in the connection area.

6. A junction connection in accordance with claim 1, wherein a shape of the outer cross section of said press plug is designed such that it corresponds to an inner cross-sectional shape of said hollow shaft in the connection area.

7. A junction connection in accordance with claim 1, wherein said press plug and said recess of said junction component are designed as a conically slightly tapering press plug in the connection area of said hollow shaft and said junction component.

8. A junction connection in accordance with claim 1, wherein said press plug is hollow or has a recess in the axial direction.

9. A junction connection in accordance with claim 1, wherein said press plug consists of a ferrous material.

10. A junction connection in accordance with claim 1, wherein said press plug consists of a nonferrous material.

11. A junction connection in accordance with claim 1, wherein said press plug has a pointed edge or a circumferential chamfer in a region of at least one axial end thereof.

12. A junction connection in accordance with claim 2, wherein said cross-sectional shape of said hollow shaft deviating from the circular shape is present essentially only in the connection area.

13. A junction connection in accordance with claim 1, wherein said hollow shaft is a torque rod spring or a roll stabilizer.

14. A junction connection in accordance with claim 1, wherein said hollow shaft is a roll stabilizer of a truck driver's cab and said junction component is a control arm for guiding the driver's cab.

15. A junction connection in accordance with claim 1, wherein said hollow shaft is a roll stabilizer of a utility vehicle axle connection and said junction component is a control arm for guiding the axle.

16. A junction connection comprising:
a junction component with a shaped continuous recess having an inner surface contour;
a hollow shaft defined by a shaft wall with an end with an outer surface contour in contact with said inner surface contour of said shaped continuous recess; and
a press plug with an outer cross section forming a force fit with an interior of said hollow shaft wall at a junction connection area, said press plug supporting said hollow shaft wall in said junction connection area and pressing said hollow shaft wall onto said inner surface contour of said recess such that a surface pressure is present between said press plug and said hollow shaft wall and such that surface pressure is present between said outer surface contour of said hollow shaft wall and said inner surface contour of said recess, wherein said junction component is connected to said hollow shaft via said surface pressure between said press plug and said hollow shaft wall and said surface pressure between said outer surface contour of said hollow shaft wall and said inner surface contour of said recess.

17. A junction connection in accordance with claim 16, wherein said press plug comprises a conically slightly tapering and said recess of said junction component comprises a conically slightly tapering press plug in the connection area of said hollow shaft and said junction component.

18. A junction connection in accordance with claim 16, wherein said hollow shaft and said recess of said junction component have an essentially polygonal cross section.

19. A junction connection in accordance with claim 18, wherein said circumference of said polygonal cross-sectional shape has an always finite curvature.

20. A junction connection in accordance with claim 16, wherein said press plug has a pointed edge or a circumferential chamfer in a region of at least one axial end thereof.

* * * * *